(12) United States Patent
Howard

(10) Patent No.: US 8,170,183 B2
(45) Date of Patent: May 1, 2012

(54) SYSTEMS AND METHODS FOR PROVIDING A MESSAGE SERVICE FOR A SITE

(75) Inventor: Michael L. Howard, Renton, WA (US)

(73) Assignee: Control4 Corporation, Salt Lake City, UT (US)

( * ) Notice: Subject to any disclaimer, the term of this patent is extended or adjusted under 35 U.S.C. 154(b) by 1223 days.

(21) Appl. No.: 11/625,749

(22) Filed: Jan. 22, 2007

(65) Prior Publication Data

US 2008/0177842 A1    Jul. 24, 2008

(51) Int. Cl.
*H04M 1/64* (2006.01)
*G06F 15/16* (2006.01)

(52) U.S. Cl. ............ 379/88.22; 340/635; 370/230; 370/254; 370/260; 370/331; 370/352; 379/32.01; 379/88.17; 379/90.01; 379/102.01; 379/142.14; 455/411; 455/414.2; 455/432.1; 455/456.3; 455/550.1; 700/9; 700/17; 700/276; 709/206; 709/238; 709/249; 715/753; 726/14

(58) Field of Classification Search ......... 340/635, 340/12.29; 370/338, 401, 230, 260, 331, 370/352, 254; 379/32.01, 88.22, 88.17, 88.14, 379/90.01, 102.01, 102.03, 142.14; 455/432.1, 455/456.3, 411, 436, 466, 406, 414.1, 414.2, 455/420, 435.1, 435.2, 550.1; 700/9, 17, 700/276; 709/206, 238, 249; 704/270; 726/1, 726/14; 715/753

See application file for complete search history.

(56) References Cited

U.S. PATENT DOCUMENTS

| | | | | |
|---|---|---|---|---|
| 5,621,662 | A * | 4/1997 | Humphries et al. | 700/276 |
| 5,706,191 | A * | 1/1998 | Bassett et al. | 700/9 |
| 5,909,183 | A * | 6/1999 | Borgstahl et al. | 340/12.29 |
| 5,983,102 | A * | 11/1999 | Gozes | 455/432.1 |
| 6,006,091 | A * | 12/1999 | Lupien | 455/435.1 |
| 6,058,355 | A | 5/2000 | Ahmed et al. | |
| 6,073,018 | A * | 6/2000 | Sallberg | 455/435.2 |
| 6,286,045 | B1 * | 9/2001 | Griffiths et al. | 709/224 |
| 6,580,950 | B1 * | 6/2003 | Johnson et al. | 700/17 |
| 6,636,505 | B1 * | 10/2003 | Wang et al. | 370/352 |
| 6,711,239 | B1 | 3/2004 | Borland | |
| 6,756,998 | B1 | 6/2004 | Bilger | |
| 6,801,507 | B1 | 10/2004 | Humpleman et al. | |
| 6,850,252 | B1 | 2/2005 | Hoffberg | |
| 6,853,291 | B1 | 2/2005 | Aisa | |
| 6,891,838 | B1 | 5/2005 | Petite et al. | |
| 6,909,921 | B1 | 6/2005 | Bilger | |
| 6,912,429 | B1 | 6/2005 | Bilger | |
| 6,914,893 | B2 | 7/2005 | Petite | |
| 6,922,562 | B2 * | 7/2005 | Ward et al. | 455/436 |
| 6,970,751 | B2 | 11/2005 | Gonzales et al. | |

(Continued)

OTHER PUBLICATIONS

International Preliminary Report on Patentability issued for International Patent Application No. PCT/US2008/051641 on Aug. 17, 2009.

(Continued)

*Primary Examiner* — Gerald Gauthier
(74) *Attorney, Agent, or Firm* — Austin Rapp & Hardman

(57) ABSTRACT

A method for providing a message service for a site is described. It is determined whether a service is provided at the site. If the service is provided at the site, a request is sent to a node at the site that provides the service. Determining if the service is provided at the site includes automatically determining if the service is provided at the site without user input.

18 Claims, 10 Drawing Sheets

U.S. PATENT DOCUMENTS

| | | | |
|---|---|---|---|
| 7,027,808 B2 | 4/2006 | Wesby | |
| 7,035,280 B2 | 4/2006 | Binder | |
| 7,039,858 B2 | 5/2006 | Humpleman et al. | |
| 7,043,532 B1 | 5/2006 | Humpleman et al. | |
| 7,046,161 B2 | 5/2006 | Hayes | |
| 7,053,764 B2 | 5/2006 | Stilp | |
| 7,054,818 B2 * | 5/2006 | Sharma et al. | 704/270 |
| 7,068,597 B1 * | 6/2006 | Fijolek et al. | 370/230 |
| 7,085,814 B1 * | 8/2006 | Gandhi et al. | 709/208 |
| 7,184,415 B2 * | 2/2007 | Chaney et al. | 370/260 |
| 7,197,120 B2 * | 3/2007 | Luehrig et al. | 379/88.14 |
| 7,366,284 B2 * | 4/2008 | Gonsalves et al. | 379/32.01 |
| 7,418,256 B2 * | 8/2008 | Kall et al. | 455/411 |
| 7,586,420 B2 * | 9/2009 | Fischer et al. | 340/635 |
| 7,818,026 B2 * | 10/2010 | Hartikainen et al. | 455/550.1 |
| 2002/0055352 A1 * | 5/2002 | Samata | 455/414 |
| 2002/0151305 A1 * | 10/2002 | Ward et al. | 455/436 |
| 2002/0194501 A1 | 12/2002 | Wenocur et al. | |
| 2004/0258018 A1 * | 12/2004 | Bjelland | 370/331 |
| 2005/0250520 A1 * | 11/2005 | Johnson et al. | 455/466 |
| 2006/0116128 A1 * | 6/2006 | Benveniste | 455/445 |
| 2006/0212818 A1 * | 9/2006 | Lee | 715/753 |
| 2006/0236387 A1 * | 10/2006 | Ballinger et al. | 726/14 |
| 2006/0239247 A1 * | 10/2006 | Postmus | 370/352 |
| 2006/0268744 A1 * | 11/2006 | Sakai et al. | 370/254 |
| 2007/0058789 A1 * | 3/2007 | Lim et al. | 379/88.17 |
| 2007/0086340 A1 * | 4/2007 | Li | 370/230 |
| 2007/0293275 A1 * | 12/2007 | Kalinichenko et al. | 455/567 |
| 2008/0101339 A1 * | 5/2008 | Forbes et al. | 370/352 |
| 2008/0148344 A1 * | 6/2008 | Rubio et al. | 726/1 |
| 2008/0261625 A1 * | 10/2008 | Hughes | 455/456.3 |
| 2009/0222593 A1 * | 9/2009 | Murai et al. | 710/12 |

OTHER PUBLICATIONS

"Users' Home Automation Systems," [online] [retrieved on Jul. 31, 2006] retrieved from http://www.csi3.com/HV_USERS.HTM, pp. 1-9.

"Easy House—Home automation software," [online] [retrieved on Jul. 31, 2006] retrieved from http://www.digibuy.com/cgi-bin/product.html?95382443023.

"NevoLink," [online] [retrieved on Jul. 31, 2006] retrieved from http://www.mynevo.com/html.php?page_id=43, pp. 1-2.

"Voice Alert Wireless Announcement System," [online] [retrieved on Jul. 31, 2006] retrieved from http://www.smarthomeusa.com/Shop/Motion/Item/VA-6000S/, pp. 1-2.

* cited by examiner

SYSTEMS AND METHODS FOR PROVIDING A MESSAGE SERVICE FOR A SITE

TECHNICAL FIELD

The present invention relates generally to computers and computer-related technology. More specifically, the present invention relates to systems and methods for providing a message service for a site.

BACKGROUND

The price of electronic devices has continued to decrease dramatically. In addition, the types of consumer electronic components and home automation electronics that can be purchased have continued to increase. For example, DVD players, large screen TVs, multi-carousel CD and DVD players, MP3 players, video game consoles, and similar consumer electronic items have become more widely available while continuing to drop in price.

The decreasing prices and increasing types of consumer electronic components has packed today's homes with modern conveniences. But as these conveniences grow in number and sophistication, they also become more difficult to manage and control. Typical homes may include from three to more than seven remote controls to manage the various electronic devices in the home.

Universal remote controls were developed to attempt to minimize the number of remote controls needed to control all of the electronic devices found in a typical home. However, universal remote controls generally did not allow for control of electronic devices that do not typically come with a remote control, such as fireplaces, window blinds, or other electronic devices.

In recent years, home automation systems have emerged to help manage and control the myriad devices found in modern homes. Home automation systems may allow the homeowner to control nearly all of the electronic devices in the home.

However, while the home automation market continues to grow each year, past solutions typically addressed customers who build high-end custom homes or do major reconstructions on an existing home. Homeowners have generally needed a more affordable way to automate their existing homes without the headache and expense of major remodeling. Additionally, homeowners have typically wanted to be able to add new products over time as they are able to afford additional technology.

Home automation companies have answered the call by utilizing new wireless technologies that have significantly reduced the costs of installing automated devices in older homes as well as newly constructed homes. The desire for control of devices at a particular location is continuing to expand into retail and other non-home markets.

There are many instances in day-to-day life when a machine or device needs to call attention to itself or communicate its' status. Many appliances, for example, include audio or visual alarms to alert or message the consumer. Some examples of appliances that can provide some kind of alert or message are a clothes dryer, a garage door opener, an oven, and a smoke detector. In a large home, these messages originate at the appliance or device and sometimes do not reach the consumer.

In some cases, the message that the device would send does not need to immediately reach the consumer. These messages include those related to maintenance that can be put off for days or weeks. Some examples are requests to change filters or add supplies which are running low. In this situation, the device manufacturer can make a non-intrusive alert such as an indicator light. Alternatively, the manufacturer could make an alert that forces the consumer to take action such as having a periodic loud audio alarm. It would be beneficial if a means existed for the device to send a message about the maintenance need and not have to run the risk of being ignored or of annoying the consumer.

Another problem that exists in home automation is the need for configuration. Many home automation systems require extensive setup. Some of the setup procedures include making decisions about what to do with every communication request or status indication from every device. When a consumer brings a new product home from a store, the device needs to be integrated into the control system in order to provide the highest level of functionality such as the messaging described above. It would be useful to have a system where new devices could automatically connect into the local messaging system where available and require no setup by the consumer.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
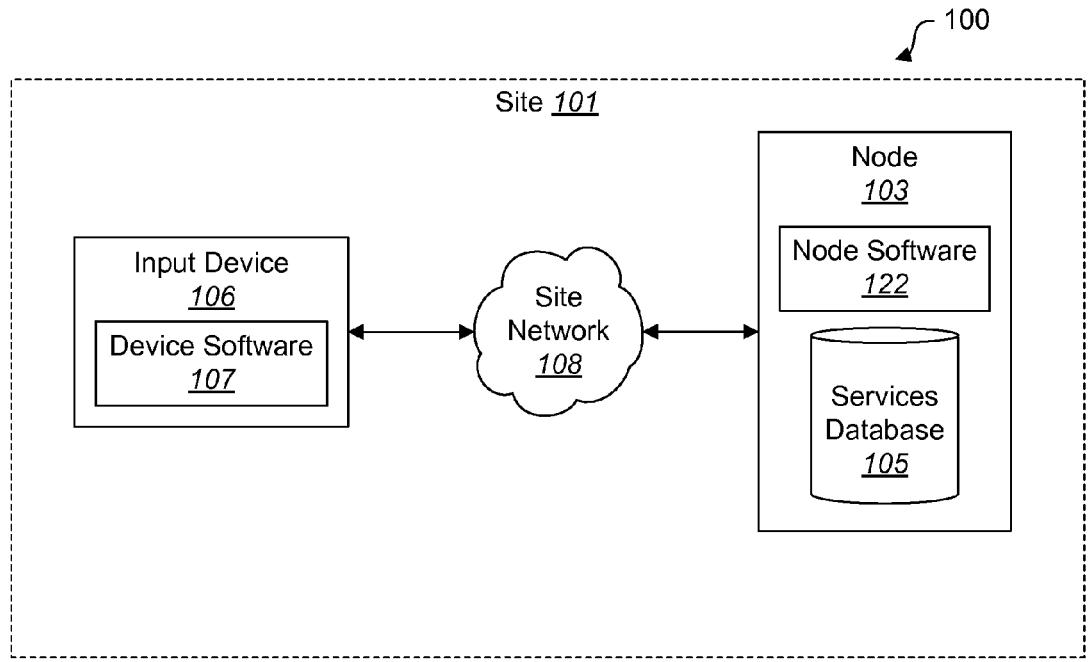
FIG. 1 is a block diagram illustrating an embodiment of a system for providing a message service for a site.

A method for providing a message service for a site is described. It is determined whether a service is provided at the site. If the service is provided at the site, a request is sent to a node at the site that provides the service. Determining if the service is provided at the site includes automatically determining if the service is provided at the site without user input.

Another embodiment of a method for providing a message service for a site is described. A first request is sent over a network at the site. It is determined whether the first request was processed. If the request was not processed, a second request is sent over the network at the site.

A system that is configured for providing a message service for a site is disclosed. The system includes an input device. The input device includes a processor. The input device also includes memory in electronic communication with the processor. Instructions are stored in the memory. The instructions are executable to send a first request over a network at the site. The instructions are also executable to determine whether the first request was received. If the request was not received, the instructions are executable to send a second request over the network at the site.

In some embodiments, a message is sent to a messaging device. In further embodiments, it is determined to which messaging device to send the message. In still further embodiments, determining to which to which messaging device to send the message includes determining the capabilities of at least one messaging device at the site.

In some embodiments, an acknowledgement that the request was received is received. In other embodiments, determining whether the first request was processed includes receiving an acknowledgement that the first request was processed. In further embodiments, if an acknowledgement that the request was received is not received within a predetermined period of time, the request is resent. In other embodiments, if an acknowledgement that the request was received is not received within a predetermined period of time, an urgent request is sent. In still further embodiments, the node acts as a proxy to provide access to services outside of the site.

In some embodiments, the acknowledgement is sent by a node. In other embodiments, the acknowledgement is sent by a messaging device.

In some embodiments, the system that is configured for providing a message service for a site includes a node. The node includes a processor. The node also includes memory in electronic communication with the processor. Instructions are stored in the memory. The instructions are executable to receive the request for a service. The instructions are also executable to provide a service based on the request.

In further embodiments, the system that is configured for providing a message service for a site includes a messaging device and the instructions on the node are further executable to send a message to the messaging device. In some embodiments, the instructions on the node are further executable to send an acknowledgment to the input device that the request was received and the instructions on the input device are further executable to receive the acknowledgment from the node.

In still further embodiments, the node includes a site controller. The site controller includes an embedded system with built-in audio ports, built-in video ports, and built-in infrared in and out ports. The site controller does not require an external exclusive computer monitor for standard operation.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

As used herein, the terms "an embodiment," "embodiment," "embodiments," "the embodiment," "the embodiments," "one or more embodiments," "some embodiments," "certain embodiments," "one embodiment," "another embodiment" and the like mean "one or more (but not necessarily all) embodiments of the disclosed invention(s)," unless expressly specified otherwise.

The term "determining" (and grammatical variants thereof) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

FIG. 1 is a block diagram illustrating an embodiment of a system 100 for providing a message service for a site. The system 100 may include a site 101. The site 101 may include an input device 106, a site network 108, and a node 103. In other embodiments, the system 100 may include multiple sites 101, input devices 106, site networks 108, and/or nodes 103.

The node 103 may include node software 122 and a services database 105. The node software 122 may be used to send and/or receive data to and/or from the input devices 106. The services database 105 may be used to store information related to services available at the site 101. The node 103 may be used to provide services at the site 101. The node 103 may be used to provide access to services at the site 101. The node 103 may be used to provide access to services outside the site 101. For example, the node 103 may act as a proxy to provide access to services outside of the site 101.

The input device 106 may be used to provide a message service for the site 101. The input device 106 may include device software 107. The device software 107 may be used to send and/or receive data to and/or from the node 103.

The node 103 may be in electronic communication with the input devices 106. The input device 106 may communicate with the node 103 over the site network 108. The site network 108 may be a wired or wireless network. For example, the input device 106 may communicate with the node 103 via an infrared (IR) connection, an Ethernet connection, a wireless connection using the 802.11g (WiFi) standard, a wireless connection using the 802.15.4 (ZigBee) standard, and/or other wired or wireless connections.

Figure 2:
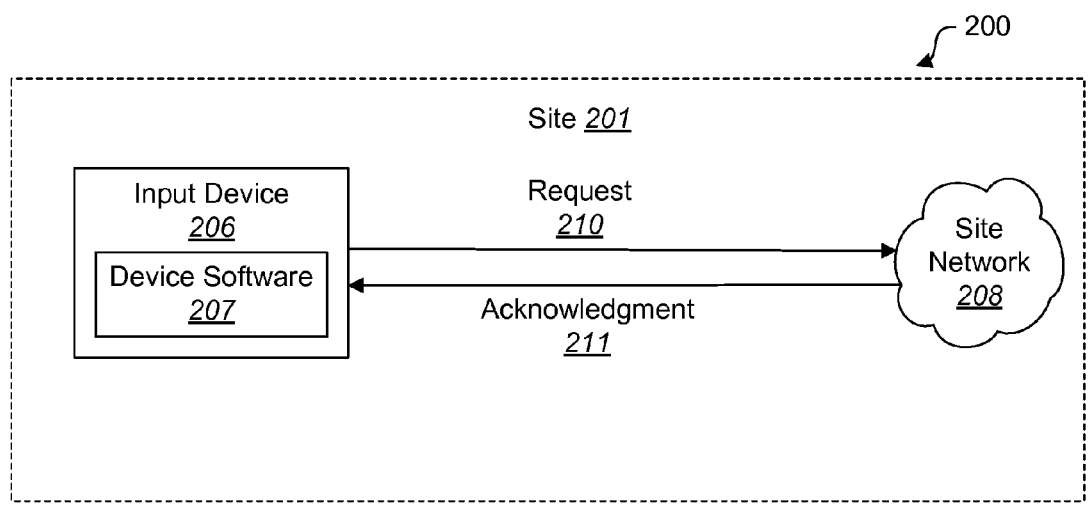
FIG. 2 is a block diagram illustrating an embodiment of a system for providing a message service for a site.

FIG. 2 is a block diagram illustrating an embodiment of a system 200 for providing a message service for a site 201. The system 200 may include a site 201. The site 201 may include an input device 206 and a site network 208. In other embodiments, the system 200 may include multiple sites 201, input devices 206, and/or site networks 208.

The input device 206 may be used to provide a message service for the site 201. The input device 206 may include device software 207. The device software 207 may be used to send and/or receive data to and/or from the site network 208. For example, the device software 207 may be used to send requests 210 to the site network 208 and/or may be used to receive acknowledgements 211 from the site network 208. Requests 210 may include a request for a particular service. Acknowledgments 211 may indicate that a request was received and/or processed. The input device 101 and node 103 shown in FIG. 1 may also send and receive requests 210 and acknowledgments 211.

The input device 206 may be in electronic communication with the site network 208. The site network 208 may be a wired or wireless network. For example, the input device 206 may communicate with the site network 208 via an infrared (IR) connection, an Ethernet connection, a wireless connection using the 802.11g (WiFi) standard, a wireless connection using the 802.15.4 (ZigBee) standard, and/or other wired or wireless connections.

Figure 3:
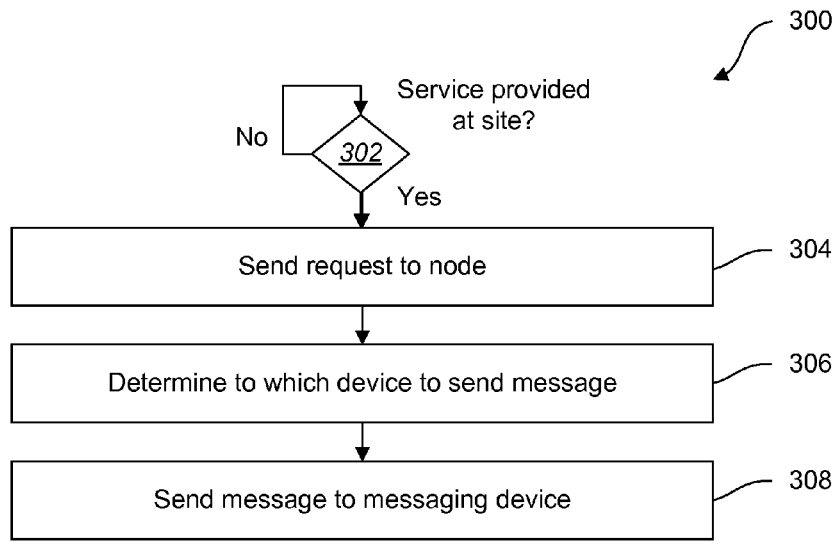
FIG. 3 is a flow diagram of an embodiment of a method for providing a message service for a site.

FIG. 3 is a flow diagram of an embodiment of a method 300 for providing a message service for a site 101. The method 300 may include determining 302 whether a service is provided at the site 101. Determining 302 whether a service is provided at the site 101 may include querying the services database 105 on the node 103. Services may be provided by a node 103, an input device 106, a messaging device, and/or another device.

The site 101 may include a messaging device. Messaging devices may provide services requested by an input device 106. Nodes 103 may provide services requested by an input device 106. Nodes 103 may also provide access to services requested by an input device 106. For example, a node 103 may provide access to a service provided at the site 101 or outside of the site 101.

A request 210 may be sent 304 to the node 103. In some embodiments, multiple nodes 103 may be included at the site 101. In other embodiments, one node 103 may be included at the site 101. In some embodiments, the request 210 may be sent 304 directly from the input device 106 that desires the service. In other embodiments, the request 210 may be sent 304 indirectly from the input device 106 that desires the service. For example, the input device 106 may send 304 the request 210 to a node 103, another input device 106, a messaging device, and/or other embedded device that may send 304 the request 210 to another node 103, input device 106, messaging device, and/or other embedded device, etc. In another example, the request 210 may be sent 304 directly and/or indirectly using mesh networking.

It may be determined 306 to which device to send a message. A message may include various types of messages. For example, a message may be a video, a text message displayed over a video being viewed, a picture in a picture message, a voice and/or sound bite, a sound message sent over the speakers of an audio/visual system, lights, a visual queue, and/or any other type of message.

In the present embodiment, the node 103 may determine 306 to which device to send the message. Determining 306 to which device to send the message may include querying the services database 105 on the node 103. The device to which the message may be sent may be an input device 106, a node 103, a messaging device, and/or another embedded device. In some embodiments, determining 306 to which device to send a message may be performed automatically.

In some embodiments, a message may include a request 210 for a service. In other embodiments, the message may be a modified request. For example, the message may include information, such as address information, for the device to which the message may be sent. In the present embodiment, the node 103 may process the message.

The message may be sent 308 to a messaging device. The message may be sent 308 by the node 103 and/or the input device 106. In the present embodiment, the message may be sent 308 using the node 103. The message may be sent 308 directly or indirectly to the messaging device. In some embodiments, the message may be sent 308 automatically after determining 306 to which device to send the message. For example, the node 103 may automatically map the requests 210 and/or messages to the various available delivery mechanisms, i.e. messaging devices.

An example of the method 300 may include a clothes dryer as an exemplary input device 106. The clothes dryer may detect that an event has occurred, i.e. the dryer finished drying a load of clothing. For example, the dryer may sense that a drying cycle has been completed, that the moisture in the dryer has fallen below a desired threshold, and/or another event. Upon detecting that an event has occurred, the clothes dryer may wish to send a notification that the event has been detected.

Typically a clothes dryer might produce an audible alert, such as a buzzer, to indicate that the dryer has detected the occurrence of an event. However, the notification may not be a sufficient notification that the event has been detected. For example, the buzzer may go unheard.

The dryer may determine 302 whether a service is provided at the site 101. For example, the dryer may query the services database 105 on a node 103 to determine whether the site 101 includes a service that may notify a user that the event has been detected.

The dryer may send 304 a request 210 to the node 103. The request 210 may include information indicating that the dryer is requesting the service that may notify a user that the event has been detected.

It may be determined 306 to which device to send the message that the dryer has detected an event. In the present example, the node 103 may determine 306 to which device to send the message. The node 103 may determine 306 that the message should be sent to a remote control. This determination 306 may be made by querying the services database 105 on the node 103.

The message may be sent 308 to a messaging device, for example the remote control. The remote control may receive the message and notify the user that the dryer has detected an event. This notification may be made by flashing a message light on the remote control.

Figure 4:
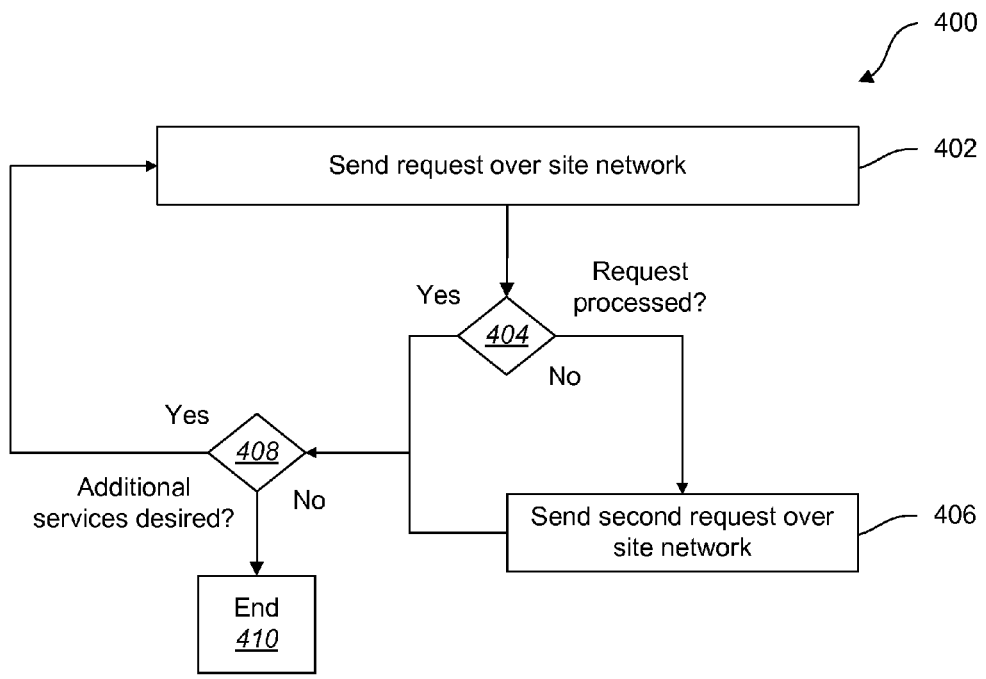
FIG. 4 is a flow diagram of an embodiment of a method for providing a message service for a site.

FIG. 4 is a flow diagram of an embodiment of a method 400 for providing a message service for a site 201. The method 400 may include sending 402 a request over a site network 208. In the present embodiment, the request 210 may not be necessarily sent 402 to a node 103. The request 210 may be broadcasted over the site network 208 to any and/or all devices at the site 201. For example, the method 400 may operate as an open loop, i.e. the method 400 may send requests 210 and/or messages without any assistance from another device, such as a node 103.

It may be determined 404 whether the request 210 was processed. Processing a request 210 may include notifying a user of an event. The determination 404 whether the request 210 was processed may be performed by input device 206.

If it is determined 404 that the request 210 was not processed, a second request 210 may be sent 406 over the site network 208. In the present embodiment, the second request 210 includes different information than the first request 210. In other embodiments, the second request 210 may include the same information as the first request 210. Requests 210 may include urgent requests, reminder requests, and/or other types of requests.

If it is determined 404 that the request 210 was processed it may be determined 408 whether additional services are desired. Determining 408 whether additional services are desired may be made by the input device 206.

If it is determined 408 that no additional services are desired, the method 400 may end. If it is determined 408 that additional services are desired, a request 210 may be sent 402 over the site network 208.

An example of the method 400 may include a clothes dryer as the exemplary input device 206. The clothes dryer may detect that an event has occurred, i.e. the dryer finished drying a load of clothing. For example, the dryer may sense that a drying cycle has been completed, that the moisture in the dryer has fallen below a desired threshold, and/or another event. Upon detecting that an event has occurred, the clothes dryer may wish to send a notification that the event has been detected.

The dryer may send 402 a request 210 over the site network 208. The request 210 may include information indicating that the dryer is requesting the service that may notify a user that the event has been detected.

The dryer may determine 404 whether the request 210 was processed. For example, the dryer may determine 404 that the request 210 was processed if the contents of the dryer are removed.

If the dryer determines 404 that the request 210 was not processed, the dryer may send 406 a second request 210 over the site network 208. If the dryer determines 404 that the second request 210 was processed, the dryer may determine 408 whether additional services are desired. If the dryer determines 408 that no additional services are desired, the method 400 may end 410. For example, the dryer may determine 408 that the original request 210 was sufficient.

If the dryer determines 408 that additional services are desired, the dryer may send 402 a request 210 over the site network 208. For example, an additional load of laundry may need to be dried by the dryer.

The determinations 404, 408 may be preceded by a pause of a predetermined period of time. For example, the dryer may wait for a predetermined period of time before determining 404 whether the request 210 was processed. In another example, the dryer may wait for a predetermined period of time before determining 408 whether additional services are desired.

Figure 5:
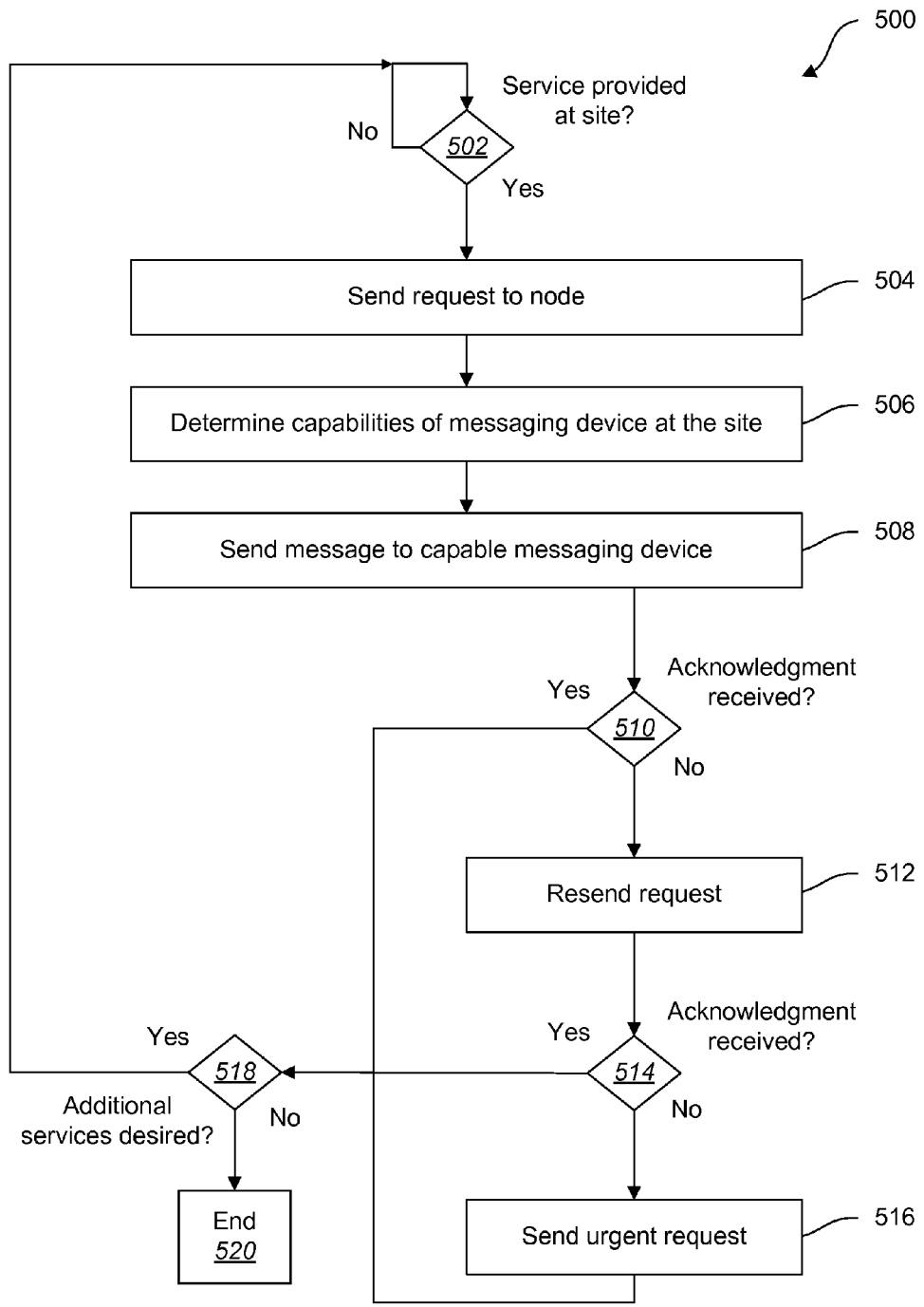
FIG. 5 is a flow diagram of an embodiment of a method for interpreting data from a site.

FIG. 5 is a flow diagram of an embodiment of a method 500 for providing a message service for a site 101. The method 500 may include determining 502 whether a service is provided at the site 101. Determining 502 whether a service is provided at the site 101 may include querying the services database 105 on the node 103.

A request 210 may be sent 504 to the node 103. The request 210 may be sent 504 directly from the input device 106 that desires the service. The request 210 may be sent 504 indirectly from the input device 106 that desires the service. For example, the input device 106 may send 504 the request 210 to a node 103, another input device 106, a messaging device, and/or other embedded device that may send 504 the request 210 to another node 103, input device 106, messaging device, and/or other embedded device, etc.

The capabilities of a messaging device at the site may be determined 506. In some embodiments, determining 506 the capabilities of a messaging device at the site may include querying the services database 105 on the node 103. In other embodiments, determining 506 the capabilities of a messaging device at the site may include querying the messaging device at the site 101. In some embodiments, the node 103 determines 506 the capabilities of a messaging device at the site 101. In other embodiments, the input device 106 determines 506 the capabilities of a messaging device at the site 101.

A device that is capable of providing the desired service may also be available to provide the desired service. For example, a device that is capable of providing a desired service may not necessarily be available to provide the service at the time of the determination 506.

If a messaging device exists at the site that is capable of providing the desired service, the message may be sent 508 to the messaging device. The message may be sent 508 directly or indirectly to the messaging device. The message may be sent 508 by the node 103 and/or the input device 106.

It may be determined 510 whether an acknowledgment 211 was received. An acknowledgement may be sent by the node 103, the messaging device, and/or any device that receives the request 210. In the present embodiment, the input device 106 may determine 510 whether an acknowledgment 211 was received. In other embodiments, the node 103 may determine 510 whether an acknowledgment 211 was received.

If it is determined 510 that an acknowledgment 211 was not received, the initial request 210 may be resent 512. Resending 512 the initial request 210 may occur after waiting a predetermined period of time. In some embodiments, the input device 106 may resend 512 the initial request 210. In other embodiments, the node 103 may resend 512 the initial request 210.

It may be determined 514 whether an acknowledgment 211 was received. If it is determined 514 that an acknowledgment 211 was not received, an urgent request 210 may be sent 516. The urgent request 210 may include information indicating the urgency of the request 210. For example, the urgent request 210 may include information in a header indicating the urgent status of the request 210. In some embodiments, the input device 106 may send 516 the urgent request 210. In other embodiments, the node 103 may send 516 the urgent request 210.

It may be determined 518 whether additional services are desired. In the present embodiment, the determination 518 whether additional services are desired may be performed if it is determined 510, 514 that an acknowledgment 211 was not received and/or after an urgent request 210 is sent 516. In other embodiments, the determination 518 whether additional services are desired may be performed at any time.

If it is determined 518 that no additional services are desired, the method 500 may end. If it is determined 518 that additional services are desired, a request 210 may be sent 504 to a node 103.

An example of the method 500 may include a clothes dryer as an exemplary input device 106 and a hallway light switch as an exemplary messaging device. The clothes dryer may detect that an event has occurred, i.e. the dryer finished drying a load of clothing. Upon detecting that an event has occurred, the clothes dryer may wish to send a notification that the event has been detected.

The dryer may determine 502 whether a service is provided at the site 101. For example, the dryer may query the services database 105 on a node 103 to determine whether the site 101 includes a service that may notify a user that the event has been detected. The desired service may be the ability to switch a light on and/or off to notify a user that the dryer has detected an event.

The dryer may send 504 a request 210 to the node 103. The request 210 may include information indicating that the dryer is requesting the service to switch a light on and/or off to notify a user that the dryer has detected an event.

The dryer may determine 506 the capabilities of the hallway light switch at the site 101. For example, to determine 506 the capabilities of the hallway light switch, the dryer may query the services database 105 on the node 103. The results of this query may indicate that the hallway light switch is capable of being switched on and/or off by the node 103 and/or dryer. The results of the query may indicate that other devices are not capable of being switched on and/or off by the node 103 and/or dryer.

The node 103 and/or dryer may send 508 a message to the hallway light switch. The message may be sent 508 directly or indirectly to the hallway light switch. If the hallway light switch receives the message, an acknowledgment 211 may be sent to the dryer indicating that the message was received. The acknowledgment 211 may indicate that the message was processed, i.e. the hallway lights were switched on and/or off. The acknowledgment 211 may be sent by the input device 106 and/or the node 103.

The dryer may determine 510 whether an acknowledgment 211 of the request 210 was received. For example, the dryer may determine 510 that the hallway light switch sent an acknowledgment 211 of the request 210 for a service. The dryer may wait for a predetermined period of time after sending 504 the request 210 to the node 103 before determining 510 whether an acknowledgment 211 was received. In another embodiment, the node 103 may determine 510 whether an acknowledgment 211 was received. If it is determined 510 that an acknowledgment 211 was not received, the dryer may resend 512 the initial request 210. In another embodiment, the dryer may send a second request 210.

The dryer may determine 514 whether an acknowledgment 211 of the resent request 210 was received. If the dryer determines 514 that an acknowledgment 211 of the resent request 210 was not received, the dryer may send 516 an urgent request 210. The dryer may determine 518 whether additional services are desired. If the dryer determines 518 that no additional services are desired, the method 500 may end 520. If the dryer determines 518 that additional services are desired, the method 500 may continue by determining 502 whether a service is provided at the site 101.

Figure 6:
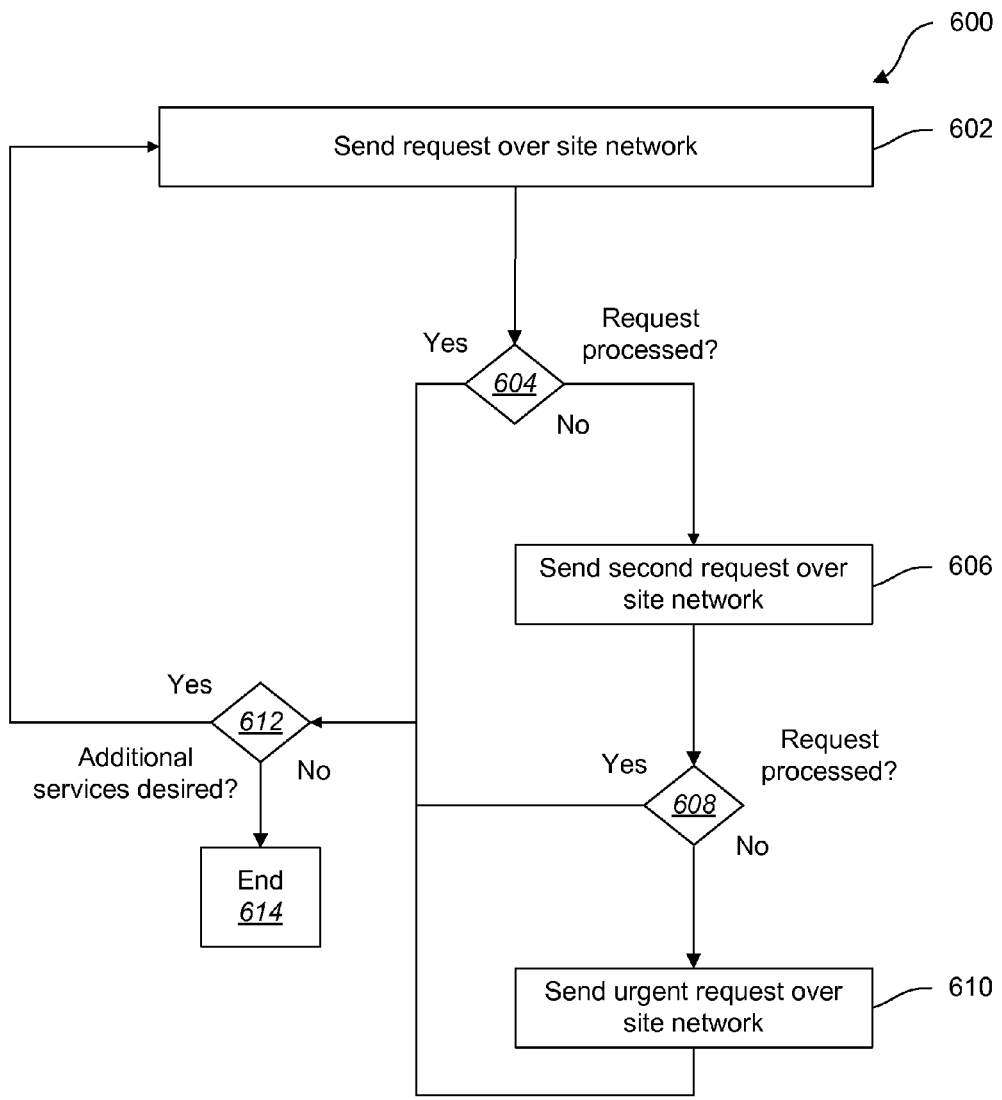
FIG. 6 is a flow diagram of an embodiment of a method for interpreting data from a site.

FIG. 6 is a flow diagram of an embodiment of a method 600 for providing a message service for a site 201. The method 600 may include sending 602 a request over a site network 208. In the present embodiment, the request 210 may not be necessarily sent 602 to a node 103. The request 210 may be broadcasted over the site network 208 to any and/or all devices at the site 201.

It may be determined 604 whether the request 210 was processed. In the present embodiment, this determination 604 is made by the input device 206. If it is determined 604 that the request 210 was not processed, a second request 210 may be sent 606 over the site network 208. In the present embodiment, the second request 210 includes different information than the first request 210. In other embodiments, the second request 210 may include the same information as the first request 210. In another embodiment, the first request 210 may be resent 606.

It may be determined 608 whether the second request 210 was processed. In the present embodiment, this determination 608 is made by the input device 206. If it is determined 608 that the second request 210 was not processed, an urgent request 210 may be sent 610 over the site network 208. The urgent request 210 may include information indicating the urgency of the request 210. For example, the urgent request 210 may include information in a header indicating the urgent status of the request 210.

It may be determined 612 whether additional services are desired. In the present embodiment, the determination 612 whether additional services are desired may be performed if it is determined 604, 608 that the request 210 was not processed and/or after an urgent request 210 is sent 610 over the site network 208. In other embodiments, the determination 612 whether additional services are desired may be performed at any time. In the present embodiment, this determination 612 is made by the input device 206.

If it is determined 612 that no additional services are desired, the method 600 may end 614. If it is determined 612 that additional services are desired, a request 210 may be sent 602 over the site network 208. In the present embodiment, this determination 612 is made by the input device 206.

An example of the method 600 may include a clothes dryer as the exemplary input device 206 and a hallway light switch and television as messaging devices. The clothes dryer may detect that an event has occurred, i.e. the dryer finished drying a load of clothing. Upon detecting that an event has occurred, the clothes dryer may wish to send a notification that the event has been detected.

The dryer may send 602 a request 210 over the site network 208. The request 210 may include information indicating that the dryer is requesting the service that may notify a user that the event has been detected. For example, the request 210 may include information indicating that the dryer is requesting the service to switch a light on and/or off and/or display a text message to notify a user that the dryer has detected an event.

The dryer may determine 604 whether the request 210 was processed. The dryer may wait for a predetermined period of time after sending 602 the request 210 over the site network 208 before determining 604 whether the request 210 was processed. If the dryer determines 604 that the request 210 was not processed, the dryer may send 606 a second request 210 over the site network 208.

The dryer may determine 608 whether the second request 210 was processed. If the dryer determines 608 that the second request 210 was not processed, the dryer may send 610 an urgent request 210 over the site network 208.

The dryer may determine 612 whether additional services are desired. In the present embodiment, the dryer may determine 612 whether additional services are desired if the dryer determines 604, 608 that the request 210 was not processed and/or after the dryer sends 610 an urgent request 210 over the site network 208. In other embodiments, the dryer may determine 612 whether additional services are desired at any time.

If the dryer determines 612 that no additional services are desired, the method 600 may end 614. If the dryer determines 612 that additional services are desired, the dryer may send 602 a request 210 over the site network 208.

Figure 7:
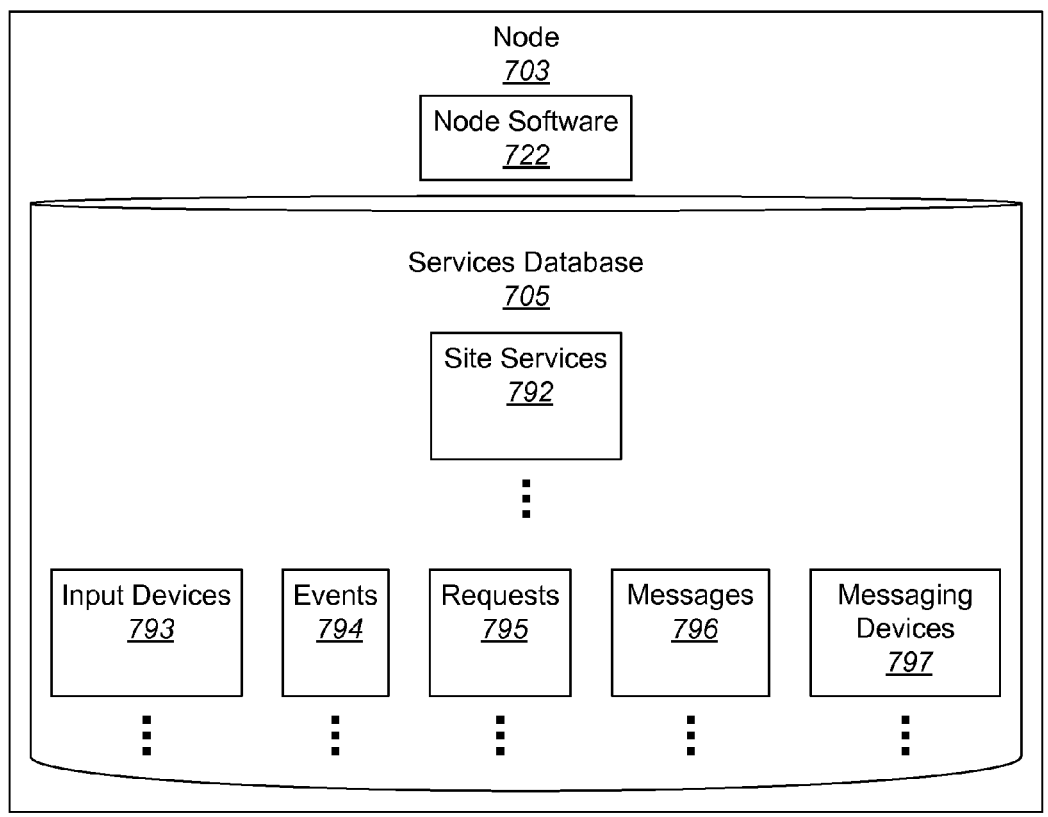
FIG. 7 is a block diagram illustrating various software components that may be used in an embodiment of a node.

FIG. 7 is a block diagram illustrating various software components that may be used in an embodiment of a node 703. The node 703 may include node software 722 and a services database 705. The node software 722 may be used to send and/or receive data to and/or from the input devices 106.

The services database 705 may be used to store information related to services available at the site 101. The services database 705 may include fields such as site services 792, input devices 793, events 794, requests 795, messages 796, and/or messaging devices 797.

Site services 792 may include the various services available at the site 101. Site services 792 may include web services. The site services 792 in the services database 705 may be queried to determine what services are available at the site 101.

The input devices field 793 may include which input devices 106, 206 are available at the site 101. In some embodiments, when an input device 106 is connected to a site 101, the input device 106 may be preconfigured to find and/or register with a node 103, such that the information relating to the input device 106 may be stored in input device field 793 in the services database 705 on the node 103. Preconfiguring an input device 106 may include storing instructions on the input device 106 such that the input device 106 does not require a user to configure the device after it is installed at a site 101. In other embodiments, when an input device 106 is connected to a site 101, the input device 106 may need to be configured by a user to find and/or register with a node 103.

The events field 794 may include events that may trigger a need for a service at the site 101. For example, if the input device 106 is a clothes dryer, an event may include finishing a drying cycle. The events field 794 may include a history of events that have occurred at the site 101.

The request field 795 may include requests 210 sent by an input device 106. The requests field 795 may include past requests 210 sent at the site 101.

The messages field 796 may include information relating to messages sent to the various messaging devices at a site 101. The messages field 796 may include past message information. Messages may be used to notify a user that an event has occurred based on a request 210 sent by an input device 106, 206. In some embodiments, a message may be a request 210. In other embodiments, a request 210 may be processed to generate a message.

The messaging devices field 797 may be stored in the services database 705. The messaging devices field 797 may include the messaging devices that are located at a site 101. The messaging devices field 797 may include information regarding the capabilities of the messaging devices at the site 101.

In the present embodiment, the fields, such as site services 792, input devices 793, events 794, requests 795, messages 796, and/or messaging devices 797, may be partially and/or entirely associated with each other in the services database 705. In other embodiments, the fields in the services database 705 may not be associated. In further embodiments, the services database 705 may be stored on an input device 106, 206.

Figure 8:
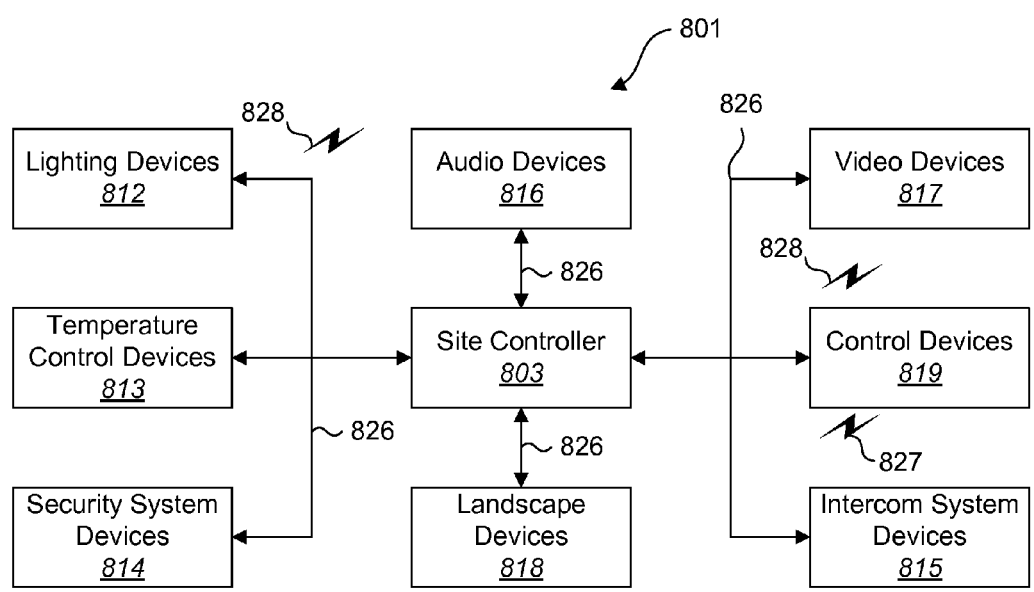
FIG. 8 is a block diagram illustrating an embodiment of a site in which the present systems and methods may be implemented.

FIG. 8 is a block diagram illustrating an embodiment of a site 801 in which the present systems and methods may be implemented. The site 801, in the present embodiment, includes a site controller 803 and other site devices. The site controller 803 may be in electronic communication with the site devices. A site 801 may include multiple site controllers 803, but typically requires that one of the site controllers 803 is designated as the primary site controller 803.

The site controller 803 may be connected to the site devices via wireless or wired connections. In the present embodiment, the site controller 803 may be connected to the site devices via an Ethernet connection 826, a WiFi connection 827, a ZigBee connection 828, or a combination of the three. The site controller 803 may be capable of communicating via these network connections, i.e. Ethernet, WiFi, or ZigBee connections 826, 827, 828 or other connections.

The site devices, in the present embodiment, may include lighting devices 812, temperature control devices 813, security system devices 814, intercom system devices 815, audio devices 816, video devices 817, landscape devices 818, and control devices 819. Lighting devices 812 may include light switches, dimmers, window blinds, etc. Temperature control devices 813 may include thermostats, fans, fireplaces, and the like. Security system devices 814 may include security cameras, motion detectors, door sensors, window sensors, gates, or other security devices. Intercom system devices 815 may include intercom microphones, intercom related video devices, and other devices typically associated with an intercom system. Audio devices 816 may include AM/FM radio receivers, XM radio receivers, CD players, MP3 players, cassette tape players, and other site devices capable of producing an audio signal. Video devices 817 may include televisions, monitors, projectors, and other site devices capable of producing a video signal. Landscape devices 818 may include sprinkler system devices, drip system devices, and other landscape related devices. The control devices 819 may include touch screens, keypads, and remote controls. For example, control devices 819 may include site remote controls, LCD keypads, mini touch screens, or other control devices 819 capable of controlling a site controller 803.

The site 801 may be similar to the sites 101, 201 disclosed in the embodiments shown in FIGS. 1 and 2. The site controller 803 may be a node 103. The site devices may include input devices 106, 206, messaging devices, and/or other devices. For example, input devices 106, 206, messaging devices, and/or other devices may be lighting devices 812, audio devices 816, video devices 817, temperature control devices 813, security system devices 814, landscape devices 818, intercom system devices 815, and/or control devices 819.

Figure 9:
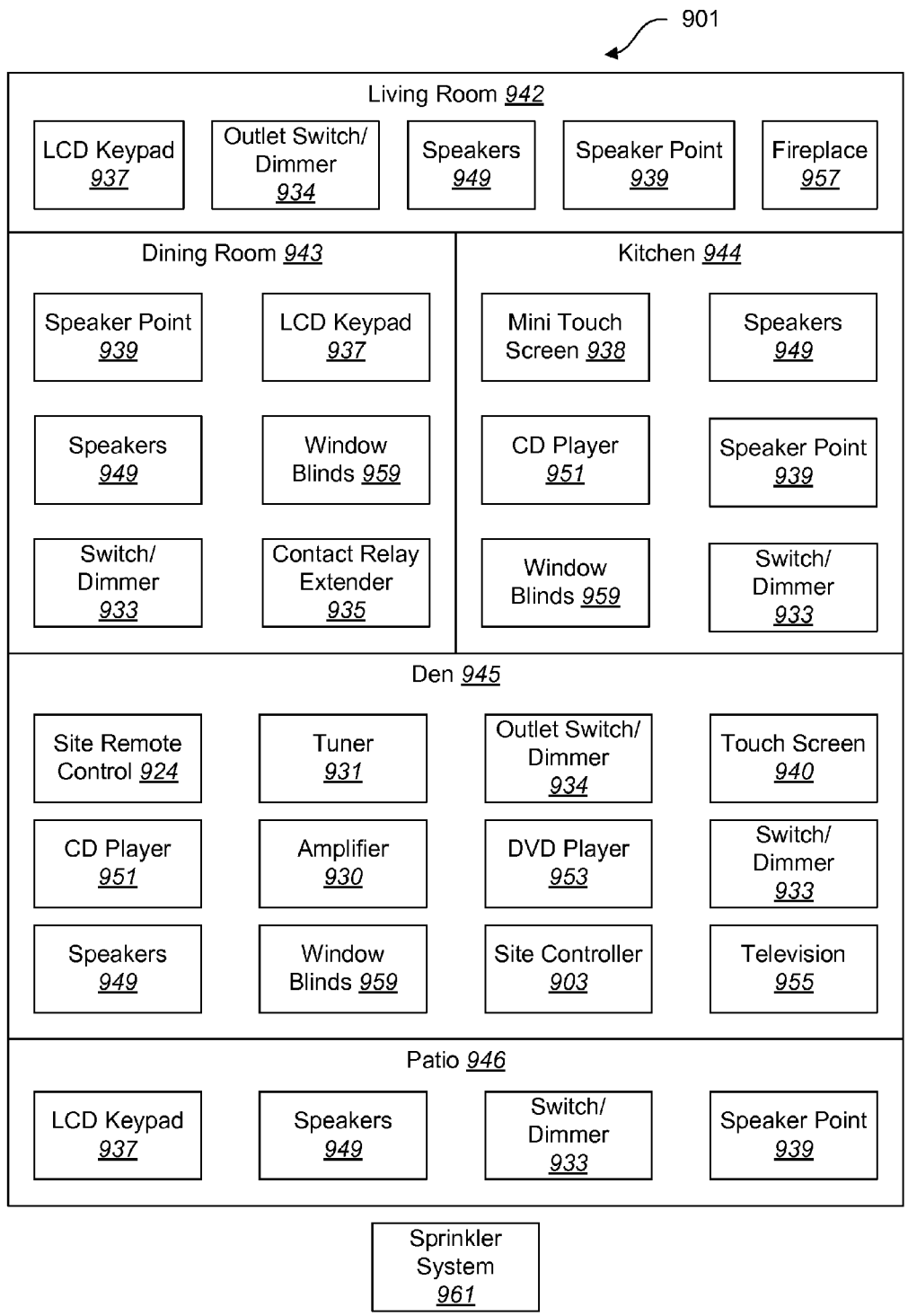
FIG. 9 is a block diagram illustrating an exemplary home automation site in which the present systems and methods may be implemented.

FIG. 9 is a block diagram illustrating an exemplary audio/visual home automation site 901 in which the present systems and methods may be implemented. The audio/visual home automation site 901 may include various areas, such as a living room 942, dining room 943, kitchen 944, den 945, and a patio 946. Though the present embodiment illustrates a home automation site 901, other sites 901 may also implement the present systems and methods. For example, the present systems and methods may be implemented in an office building, warehouse, or other site 901. A site 901 may not be limited to a particular building or space. Rather, a site 901 may include a site controller 903 and various site devices in electronic communication with the site controller 903. A home, for example, may include more than one site 901. In some embodiments, multiple site controllers 903 may be used within the same site, though one site controller 903 is typically designated as the primary site controller 903.

Additional site devices, other than the site devices shown in FIG. 9, such as security system devices 814, intercom system devices 815, temperature control devices 813, etc., may also be used in the present embodiment of a site 901. However, for ease of presentation, only lighting devices 812, audio devices 816, video devices 817, landscape devices 818, and control devices 819 are shown in FIG. 9. In the present embodiment, the audio devices 816 include amplifiers 930, tuners 931, speakers 949, speaker points 939, and CD players 951. The video devices 817, in the present embodiment, may include DVD players 953 and televisions 955. In the present embodiment, control devices 819 may include site remote controls 924, LCD keypads 937, mini touch screens 938, or other control devices 819. In the present embodiment, the lighting devices 812 may include switch/dimmers 933, outlet switch/dimmers 934, fireplaces 957, and window blinds 959. The landscape devices 818, in the present embodiment, may include a sprinkler system 961. Other audio devices 816 and video devices 817 may be used in the present systems and methods, such as MP3 players, digital video recorders, satellite boxes, cable boxes, video game systems, and the like. Other lighting devices 812 and landscape devices 818 may also be used with the present systems and methods.

The site controller 903, in the present embodiment of a site 901, may be located in the den 945. The site controller 903 may be in electronic communication with various site devices over the site network 108, 208. In the present embodiment, some site devices, such as audio switches, amplifiers, and tuners may be connected to the site controller 903 via Ethernet connections 826. Site remote controls 924 may be connected to the site controller 903 via ZigBee connections 828. Switch/dimmers 933, outlet switch/dimmers 934, multiple button keypads (not shown), and LCD keypads 937 may be connected to the site controller 903 via Ethernet connections 826 and ZigBee connections 828. Mini touch screens 938 and contact relay extenders 935 may be connected to the site controller 903 via an Ethernet connection 826, a ZigBee connection 828, and a WiFi connection 827. Speaker points 939 may be connected to the site controller 903 via an Ethernet connection 826 and a WiFi connection 827. Touch screens 940 may be connected to the site controller 903 via a ZigBee connection 828 and a WiFi connection 827.

In the present embodiment, the den 945 may include the site controller 903, a switch/dimmer 933, an outlet switch/dimmer 934, a CD player 951, a DVD player 953, an amplifier 930, a tuner 931, a television 955, speakers 949, and window blinds 959. The speakers 949 in the den 945 may be connected directly to the site controller 903. A site remote control 924 and a touch screen 940 may also be located in the den 945.

In the present embodiment, speakers 949 that are not directly connected to the site controller 903, such as the speakers 949 in the living room 942, dining room 943, and kitchen 944 and the speakers 949 on the patio 946, may be connected to one of the speaker points 939. The speaker points 939 may allow the speakers 949 not directly connected to the site controller 903 to be controlled by the site controller 903. For example, the site controller 903 may transmit audio signals to the speakers 949 via the speaker points 939. The audio signals, in the present embodiment, may be transmitted to the speaker points 939 over an Ethernet connection 826 or a WiFi connection 827. However, any connection capable of the bandwidth necessary to transmit audio signals may be used. Similar connections may be used for transmitting video signals over a site 901.

The site remote control 924 and touch screen 940 in the den 945, the LCD keypads 937 located in the living room 942, dining room 943, and on the patio 946, and the mini touch screen 938 located in the kitchen 944 may be used to control all of the site devices in the site 901 that are connected to the site controller 903. For example, the LCD keypad 937 in the living room 942 may control the CD player 951 in the den 945 to play music over the speakers 949 in the living room 942 via the speaker point 939 in the living room 942. The LCD keypad 937 in the living room 942 may also, for example, control the CD player 951 in the den 945 to play music over all speakers 949 in the site 901 via their respective speaker points 939 or a direct connection to the site controller 903.

Typically devices like the window blinds 959, the fireplace 957, or the sprinkler system 961 may not be capable of communication using an Ethernet, WiFi, or ZigBee connection 826, 827, 828. In order to control such devices, the contacts, relays, or other connections that control their function may be connected to a site device that is capable of communication with a site controller 903.

For example, the window blinds 959 in the dining room 943 may be connected to a contact relay extender 935. The contact relay extender 935 may then communicate with the site controller 903 using an Ethernet connection 826, a WiFi connection 827, or a ZigBee connection 828. The site controller 903 may then be programmed to raise, lower, or adjust the blinds 959. If a user wanted to lower the blinds 959 in the dining room 943, the user may use the LCD keypad 937 to send a signal to the site controller 903, which would send a signal to the contact relay extender 935, which would then send a signal to the servo of the window blinds 959 to lower the blinds. The sprinkler system 961 may be connected to the site controller 903 in a similar fashion.

The site 901 may be similar to the sites 101, 201 disclosed in the embodiments shown in FIGS. 1 and 2. The site controller 903 may be a node 103. Input devices 106, 206, messaging devices, and/or other devices may be lighting devices 812, audio devices 816, video devices 817, temperature control devices 813, security system devices 814, landscape devices 818, intercom system devices 815, and/or control devices 819. In some embodiments, site devices may be both input devices 106, 206 and messaging devices. For example, control device 819 such as a site remote control 924, a touch screen 940, and/or an LCD keypad 937 may be both an input device 106, 206 and a messaging device. In other embodiments, some input devices 106, 206 and messaging devices may only be either an input device 106, 206 or a messaging device. For example, speakers 949 may be messaging devices, but not input devices 106, 206.

Figure 10:
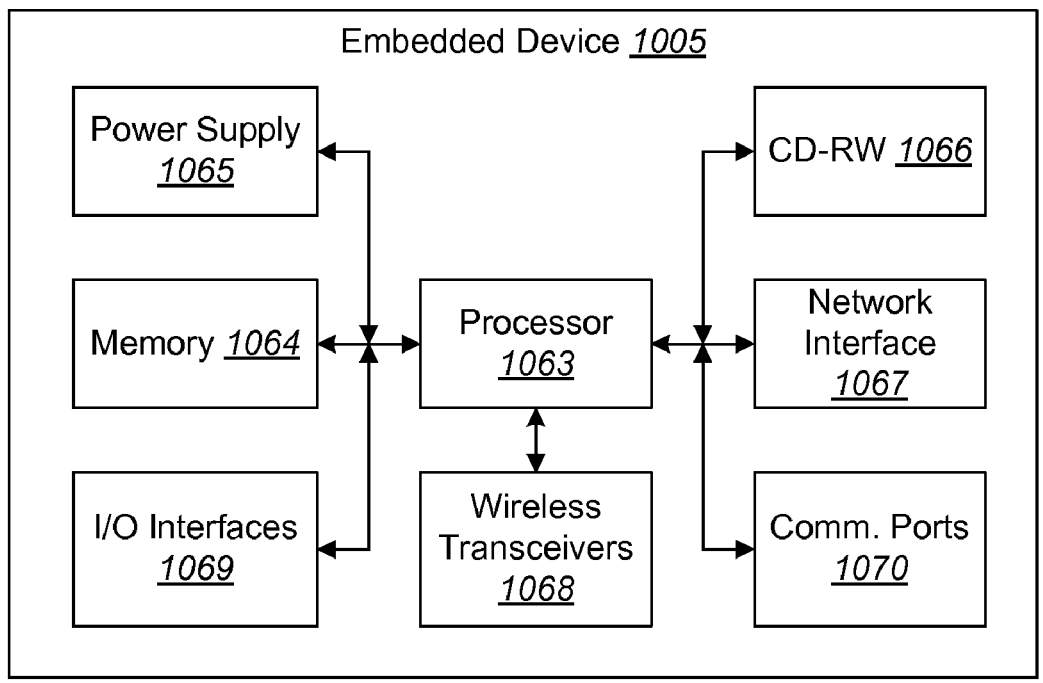
FIG. 10 is a block diagram illustrating various hardware components that may be used in an embodiment of an embedded device that may be found in the site.

FIG. 10 is a block diagram illustrating various hardware components that may be used in an embodiment of an embedded device 1005 that may be found in the site 101, 201. The nodes 103, input devices 106, messaging devices, site controllers 803, site devices, and/or other devices may be embedded devices 1005.

The embedded device 1005 may include a processor 1063 that is in electronic communication with memory 1064. The memory 1064 may include volatile and/or non-volatile memory. The embedded device 1005 may include a power supply 1065. The embedded device 1005 may include a CD-RW drive 1066. In other embodiments, the CD-RW drive 1066 may not be a writeable drive, but may only be a CD-ROM drive. In still other embodiments, the CD-RW drive 1066 may be a DVD-RW or a DVD-ROM drive. The CD-RW drive 1066 may also be a Blu-ray disk or a HD DVD drive. The embedded device 1005 may be capable of using the CD-RW drive 1066 to rip audio or video data from CDs and DVDs.

The embedded device 1005 may include a network interface 1067 that allows the embedded device 1005 to connect using wired connections, such as Ethernet connections 826. The network interface 1067 may use various protocols to enable the embedded device 1005 to interface with any wired network. The embedded device 1005 may include wireless transceivers 1068. In the present embodiment, the embedded device 1005 may include a WiFi transceiver and a ZigBee transceiver. The embedded device 1005 may include any type of wireless transceiver 1068. For example, the wireless transceiver 1068 may allow the embedded device 1005 to transmit and receive data using any wireless protocol, such as WiFi, ZigBee, Bluetooth, Ultra Wideband, Wimax, and/or cellular protocols, such as GSM or EVDO.

The embedded device 1005 may include I/O interfaces 1069. For example, the I/O interfaces 1069 may include inputs and/or outputs such as buttons, selection dials, serial ports, contact ports, relay ports, IR windows, IR ports, video sense loop ports, audio ports, and video ports. The embedded device 1005 may include communication ports 1070. The communication ports 1070 may include USB ports, firewire ports, or other ports for communicating with other devices.

Some site controllers 803 and site devices may not include all of the illustrated components. Other site controllers 803 and site devices may include additional components. For example, many site devices may not include a CD-RW drive 1066.

Figure 11:
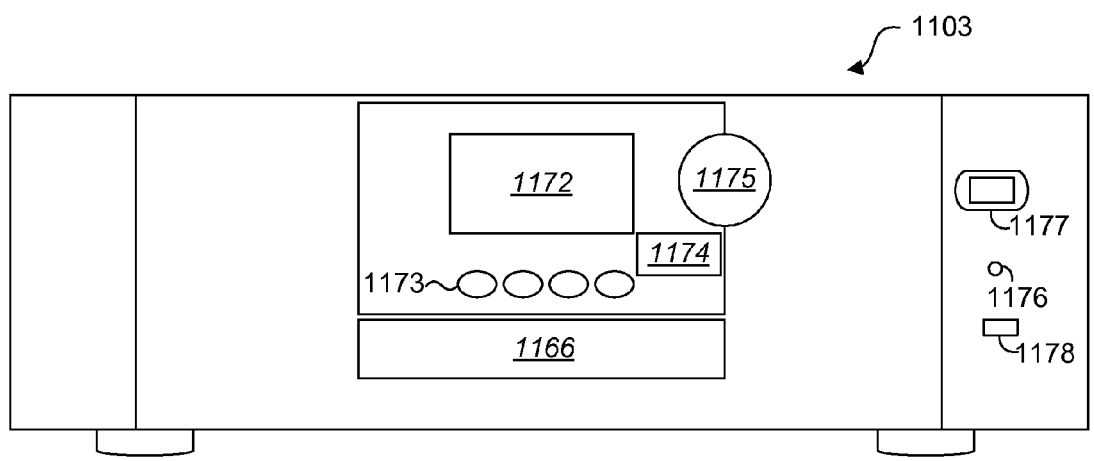
FIG. 11 is a front view of a block diagram illustrating the various features available on an exemplary site controller.

FIG. 11 is a front view of a block diagram illustrating the various features available on an exemplary site controller 1103. Specifically, FIG. 11 shows the front of an exemplary site controller 1103.

The site controller 1103 may include a display area 1172. The display area 1172 in the present embodiment may be used to display settings, playlist sections, title sections, media information, receiver status, and system menus. The site controller 1103 may also include various buttons 1173 for selecting options displayed in the display area 1172.

The site controller 1103 may also include an IR in window 1174. The IR in window 1174 may be used to receive IR codes from the site remote control 924 or from any other device capable of sending IR signals, including other remote controls (not shown) used to control devices that are not capable of communication with the site controller 1103. The site controller 1103 may include a selection dial 1175. The selection dial 1175 may be used to scroll through menus and media lists displayed in the display area 1172.

In the present embodiment, the site controller 1103 may include a reset button 1176. The reset button 1176 may be used to refresh the node software 122. The site controller 1103 may also include a WiFi antenna 1177. The WiFi antenna 1177 may be used with an extender (not shown) to improve reception of wireless signals. A ZigBee antenna (not shown) may also be used to extend the range of a wireless transceiver 1068 using a ZigBee connection 828.

The site controller 1103 may also include a CD-RW drive 1166. As discussed above, the CD-RW drive 1166 may be replaced with any drive that is capable of playing CD or DVD related media. The CD-RW drive 1166 may be used to import CD or DVD data into the memory 1064 of the site controller 1103. The site controller 1103 may also include a USB port 1178. The USB port 1178 may be used to import data from USB enabled devices.

The display area 1172 may be used to display messages sent to the site controller 803, 903. The WiFi antenna 1177 and/or the USB port 1178 may be used to send and/or receive requests 210, messages, and/or acknowledgments 211 over the site network 108, 208.

Figure 12:
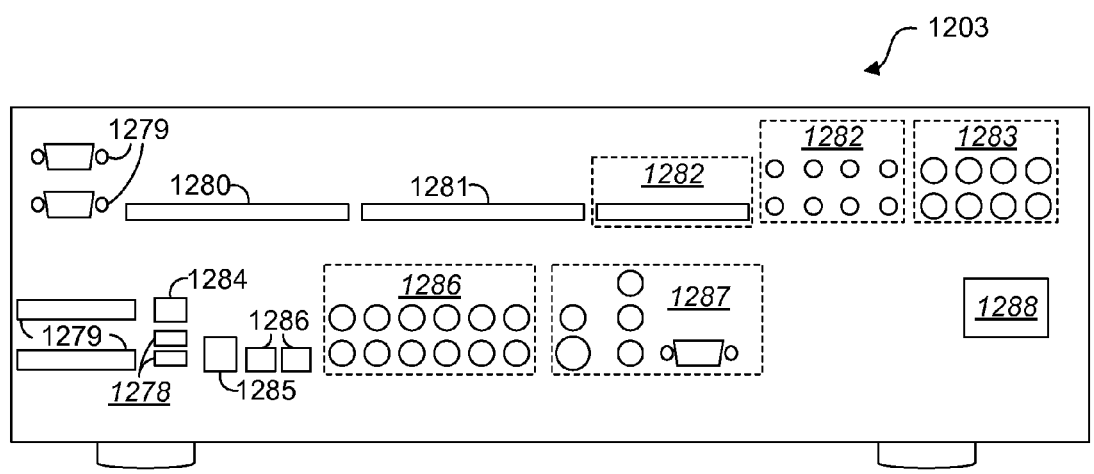
FIG. 12 is a rear view of a block diagram illustrating the various features available on an exemplary site controller.

FIG. 12 is a rear view of a block diagram illustrating the various features available on an exemplary site controller 1203. Specifically, FIG. 12 shows the back of an exemplary site controller 1203. Most connectors and ports are typically found on the back of the site controller 1203 leaving the front more aesthetically pleasing. However, the location of the various connectors and ports is typically not functionally important.

The site controller 1203 may include serial ports 1279. The serial ports 1279 may include standard serial ports and configurable serial ports. The standard serial ports may be used for RS-232 or other I/O devices, which include hardware flow control. In the present embodiment, the site controller 1203 may include two standard serial ports. The configurable serial ports may be used for RS-232, RS-422, or RS-485 devices or for other serial I/O devices. In the present embodiment, the site controller 1203 may include two configurable serial ports.

The site controller 1203 may include contact ports 1280. The contact ports 1280 may include a pluggable terminal block connector that may be used for dry contact closure, or logic input connections, such as door switches or motion sensors. In the present embodiment, the site controller 1203 may include six contact ports 1280. The site controller 1203 may include relay ports 1281. The relay ports 1281 may include a pluggable terminal block connector that may be used for normally closed or normally opened switchable connections, such as blinds, fireplace, or projector screens. In the present embodiment, the site controller 1203 may include six relay ports 1281.

The site controller 1203 may include IR ports 1282. The IR ports 1282 may include IR in ports and IR out ports. The IR in ports may include a pluggable terminal block connector that may be used for handheld IR devices, such as device specific remote controls (not shown). In the present embodiment, the site controller 1203 may include four IR in ports. The IR out ports may include 3.5 mm earphone jacks. The IR out ports may be used for IR sticky emitters that can be placed over IR readers on media players, TVs, or other targets to transmit an IR signal from site controller 1203 to the target. In the present embodiment, the site controller 1203 may include eight IR out ports. The site controller 1203 may include video sense loop in/out ports 1283. The video sense loop in/out ports 1283 may be composite ports for video sources, such as DVD players or VCRs, which allow the site controller 1203 to detect the On/Off status of devices that use the same IR code for both on and off commands. The site controller 1203, in the present embodiment, may include four pairs of video sense loop in/out ports 1283 (four in and four out).

The site controller 1203 may include an Ethernet connector 1284 for establishing an Ethernet connection 826 with the site devices in a site 101. The Ethernet connector 1284 may be connected to the network interface 1067 on the site controller 1203. The Ethernet connector 1284 may be an RJ-45 for a 10/100 BaseT Ethernet connector. In the present embodiment, the site controller 1203 may include an additional USB port 1278 on the back of the site controller 1203. A modem port 1285 may be included with the site controller 1203. The modem port 1285 may be an RJ-11 port for a modem to support caller ID or a voice menu system.

The site controller 1203 may also include audio in/out ports 1286. The audio in ports may be RCA jacks for stereo channel input for stereo analog sources. In the present embodiment, the site controller may include three audio in ports. The audio out ports may be RCA jacks for stereo channel output. In the present embodiment, the site controller 1203 may include three audio out ports. The audio in/out ports 1286 may include digital audio in/out ports. The digital audio in/out ports may be designed for a Toslink™ optical cable for digital audio in/out, like MP3 players, CD players, DVD players, etc.

The site controller 1203 may include various video ports 1287. The video ports 1287 may be in/out ports and may include composite video ports, S-Video ports, component video ports, and/or VGA ports. The video ports 1287 may be used to display navigation menus on a monitor or TV. In the present embodiment, the video ports 1287 include a composite video out port, an S-Video out port, a component video out port, and a VGA out port. A power plug port 1288 may be included in the site controller 1203.

The site controller 1203 is different than a personal computer for a number of reasons. The site controller 1203 is an embedded system that is specialized for the functions and purposes set forth herein. The site controller 1203 generally does not include a keyboard or mouse for standard operation. Unlike a personal computer, the site controller 1203 may not contain an expandable motherboard. For example, the site controller 1203 may not include expandable memory slots or expandable ports, such as a PCI, AGP, or PCI Express card slot. Unlike a personal computer, the site controller 1203 may also not have an exclusive computer monitor. For example, typically a personal computer may include a relatively large monitor or display that is primarily for viewing an operating system user interface and executed programs. The site controller 1203 may merely use a television or monitor for brief periods of time, although the television or monitor may primarily be used for viewing television programming, DVDs, etc. In another example, the site controller 1203 may be used without a separate monitor; the site controller 1203 may use the display area 1272. Typically, a personal computer with such a small display area would be incapable of the multiple interfaces and ports that may be found on a site controller 1203. The site controller 1203 may also not have the capability to install and run third party software, such as word processing software. The site controller 1203 typically does not allow a user to install and run third party software on the controller 1203. Unlike a personal computer, a typical user generally could not install a different operating system on the site controller 1203.

The various communication ports 1070 may be used to send and/or receive requests 210, messages, and/or acknowledgments 211 over the site network 108, 208. For example, the various communication ports 1070 may be used to notify a user of a detected event.

Figure 13:
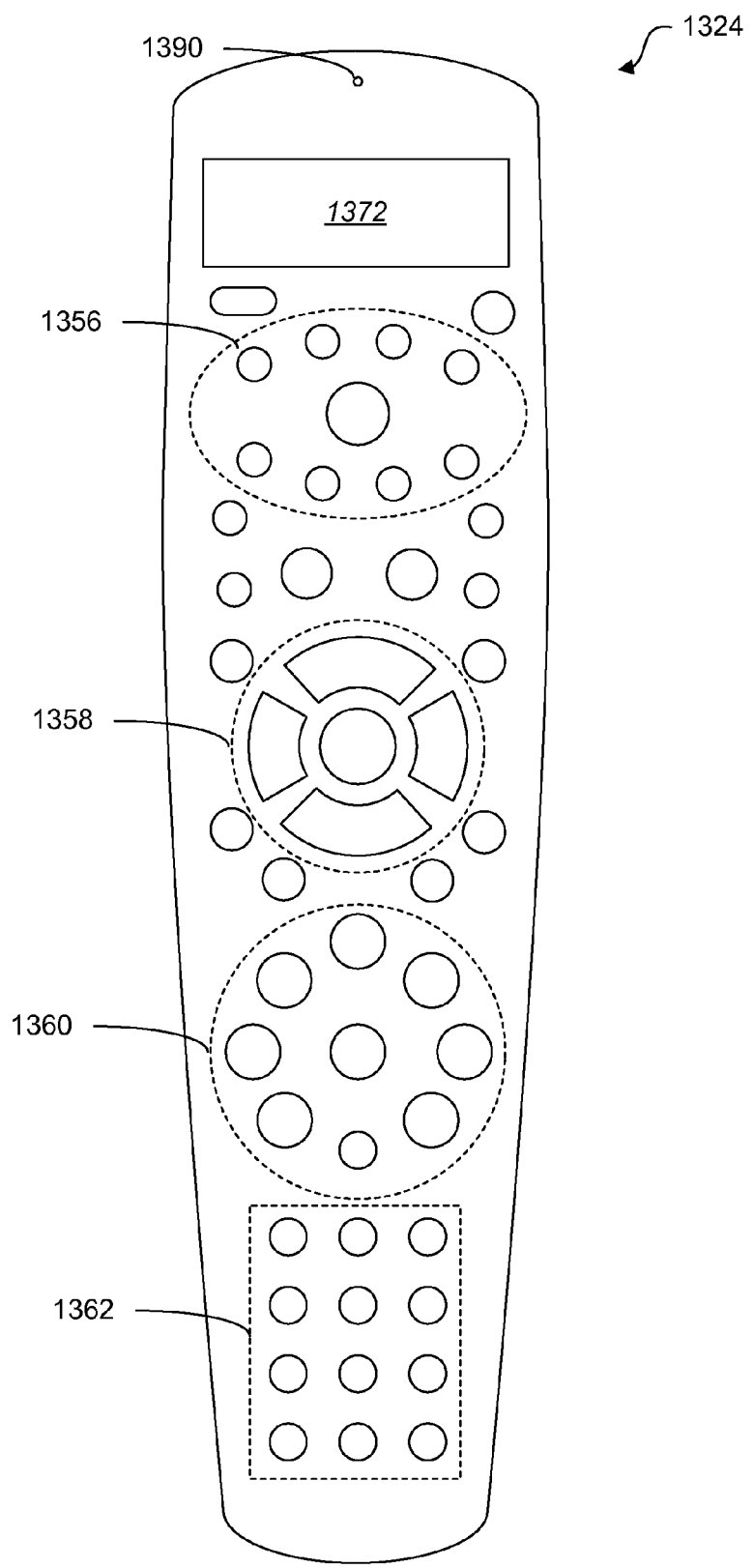
FIG. 13 is a block diagram illustrating the various features available on an exemplary site remote control.

FIG. 13 is a block diagram illustrating the various features available on an exemplary site remote control 1324. The site remote control 1324 may include a display area 1372. The display area 1372 may be a backlit LCD screen. In some embodiments, the display area 1372 may be a simple LCD screen such that the LCD screen has limited capacity to display information.

The site remote control 1324 may include a microphone 1390, an audio in port 1286, or the like. In the present embodiment, the site remote control 1324 may not include a speaker 949. In other embodiments, the site remote control 1324 may include a speaker 949, audio out port 1286, or the like.

The site remote control 1324 may include various I/O interfaces 1069. The I/O interfaces 1069 may include buttons or controls for user input. For example, the site remote control 1324 may include activity selection buttons 1356, navigation controls 1358, device control inputs 1360, input controls 1362, or other I/O interfaces 1069. The activity selection buttons 1356 may allow the user to select which devices to control. For example, the activity selection buttons 1356 may include buttons that allow the user to control televisions, video recording/playback devices, temperature control devices, lighting devices, security devices, audio recording/playback devices, or other devices.

The navigation controls 1358 may include navigation buttons that allow a user to navigate through user interfaces. For example, navigation buttons may allow the user to select various options presented in the display area 1372.

The device control inputs 1360 may include device control buttons. The device control inputs 1360 may allow a user to perform functions that were previously performed by the device specific remote control. For example, the device control inputs 1360 may include device control buttons such as play, stop, pause, fast-forward, rewind, record, etc. that would typically be found on a DVD or VCR device specific remote control.

The input controls 1362 may include numeric, alphanumeric, or other arrangements of input buttons. The input controls 1362 may allow a user to input alphanumeric characters. For example, in the present embodiment, the input controls 1362 may be numeric buttons such as the numbers 0-9 that may also be used to input text using various systems, such as Multi-Tap or T9, iTap, LetterWise, or other predictive text technology. The input controls 1362 may include a qwerty keyboard, thumbboard, or other layout.

The site remote control 1324 may include a wireless transceiver 1068. The wireless transceiver 868 may be used to send wireless signals over the site network 108. In the present embodiment, the wireless transceiver 868 may be used to send data over a ZigBee connection 828.

The site remote control 1324 may be used as an input device 106, 206, messaging device, and/or other device. For example, the site remote control 1324 may be used as a messaging device by using the display area 1372 to display messages from the node 103 and/or input device 106, 206.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Functions such as executing, processing, performing, running, determining, notifying, sending, receiving, storing, requesting, and/or other functions may include performing the function using a web service. Web services may include software systems designed to support interoperable machine-to-machine interaction over a computer network, such as the Internet. Web services may include various protocols and standards that may be used to exchange data between applications or systems. For example, the web services may include messaging specifications, security specifications, reliable messaging specifications, transaction specifications, metadata specifications, XML specifications, management specifications, and/or business process specifications. Commonly used specifications like SOAP, WSDL, XML, and/or other specifications may be used.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for providing a message service for a site, comprising:
    determining if a message service is provided at the site, wherein determining if the message service is provided at the site further comprises automatically determining if the message service is provided at the site without user input;
    if the message service is provided at the site, sending a request to a node at the site that provides the message service; and
    determining to which messaging device to send the message, wherein determining to which messaging device to send the message further comprises determining the capabilities of at least one messaging device at the site.

2. The method of claim 1, further comprising sending a message to the messaging device.

3. The method of claim 1, further comprising receiving an acknowledgement that the request was received.

4. The method of claim 3, further comprising if an acknowledgement that the request was received is not received within a predetermined period of time, resending the request.

5. The method of claim 3, further comprising if an acknowledgement that the request was received is not received within a predetermined period of time, sending an urgent request.

6. The method of claim 1, wherein the node acts as a proxy to provide access to services outside of the site.

7. A method for providing a message service for a site, comprising:
    determining to which messaging device to send a first request, wherein determining to which messaging device to send the first request comprises determining the capabilities of at least one messaging device at the site;
    sending the first request over a network at the site that comprises a message service;
    determining whether the first request was processed; and
    if the request was not processed, sending a second request over the network at the site.

8. The method of claim 7, wherein determining whether the first request was processed further comprises receiving an acknowledgement that the first request was processed.

9. The method of claim 8, further comprising if the acknowledgement is not received within a predetermined period of time, resending the first request.

10. The method of claim 8, further comprising if the acknowledgement is not received within a predetermined period of time, sending an urgent request.

11. The method of claim 8, wherein the acknowledgement is sent by a node.

12. The method of claim 8, wherein the acknowledgement is sent by the messaging device.

13. The method of claim 7, wherein the node acts as a proxy to provide access to services outside of the site.

14. A system that is configured for providing a message service for a site, the system comprising:
    an input device comprising:
    a processor;
    memory in electronic communication with the processor; and
    instructions stored in the memory, the instructions being executable to:
        determine to which messaging device to send a first request, wherein the instructions to determine to which messaging device to send the first request comprises instructions to determine the capabilities of at least one messaging device at the site;
        send the first request over a network at the site that comprises a message service;
        determine whether the first request was received; and
        if the request was not received, send a second request over the network at the site.

15. The system of claim 14, further comprising a node comprising:
    a processor;
    memory in electronic communication with the processor; and
    instructions stored in the memory, the instructions being executable to:
        receive the request for a service; and
        provide a service based on the request.

16. The system of claim 15, further comprising the messaging device and wherein the instructions on the node are further executable to send a message to the messaging device.

17. The system of claim 15, wherein the instructions on the node are further executable to send an acknowledgment to the input device that the request was received and wherein the instructions on the input device are further executable to receive the acknowledgment from the node.

18. The system of claim 15, wherein the node further comprises a site controller, wherein the site controller comprises an embedded system that includes built-in audio ports, built-in video ports, and built-in infrared in and out ports and wherein the site controller does not require an external exclusive computer monitor for standard operation.

* * * * *